(12) United States Patent
Zhuang

(10) Patent No.: US 9,218,023 B2
(45) Date of Patent: Dec. 22, 2015

(54) FOLDABLE STRUCTURE FOR PORTABLE DEVICES

(71) Applicant: Yueping Zhuang, Cranford, NJ (US)

(72) Inventor: Yueping Zhuang, Cranford, NJ (US)

( * ) Notice: Subject to any disclaimer, the term of this patent is extended or adjusted under 35 U.S.C. 154(b) by 0 days.

(21) Appl. No.: 14/556,284

(22) Filed: Dec. 1, 2014

(65) Prior Publication Data
US 2015/0098185 A1    Apr. 9, 2015

Related U.S. Application Data

(63) Continuation of application No. 14/556,120, filed on Nov. 29, 2014, now abandoned.

(51) Int. Cl.
*H05K 5/00* (2006.01)
*H05K 7/00* (2006.01)
*G06F 1/16* (2006.01)

(52) U.S. Cl.
CPC ............ *G06F 1/1626* (2013.01); *G06F 1/1656* (2013.01)

(58) Field of Classification Search
CPC ....................................... F16M 11/10
USPC ....................... 361/679.01–679.03
See application file for complete search history.

(56) References Cited

U.S. PATENT DOCUMENTS

2009/0314915  A1 *  12/2009  Tu et al. ................. 248/398

* cited by examiner

*Primary Examiner* — Jerry Wu

(57) ABSTRACT

A foldable structure for the support and use of portable devices is presented. The structure is attached to the back panel of a portable device or the device case. When the structure is unfolded, it rests flat in the indented area at the rear side of a portable device or the device case without changing the look and feel of the device. When the structure is folded, it forms a grip or device support stand to augment the functionality and usefulness of the portable device.

4 Claims, 10 Drawing Sheets

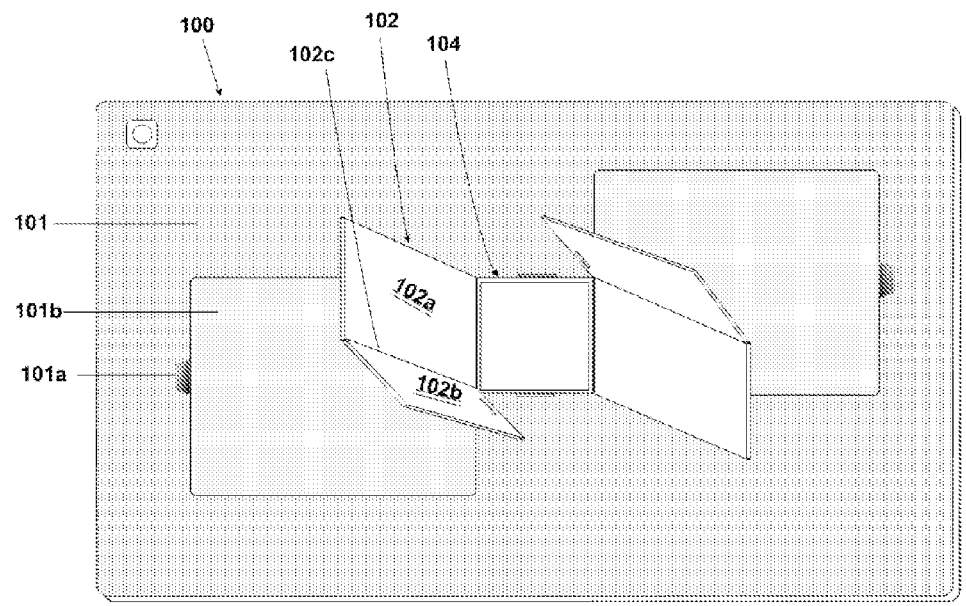
FIG. 1E
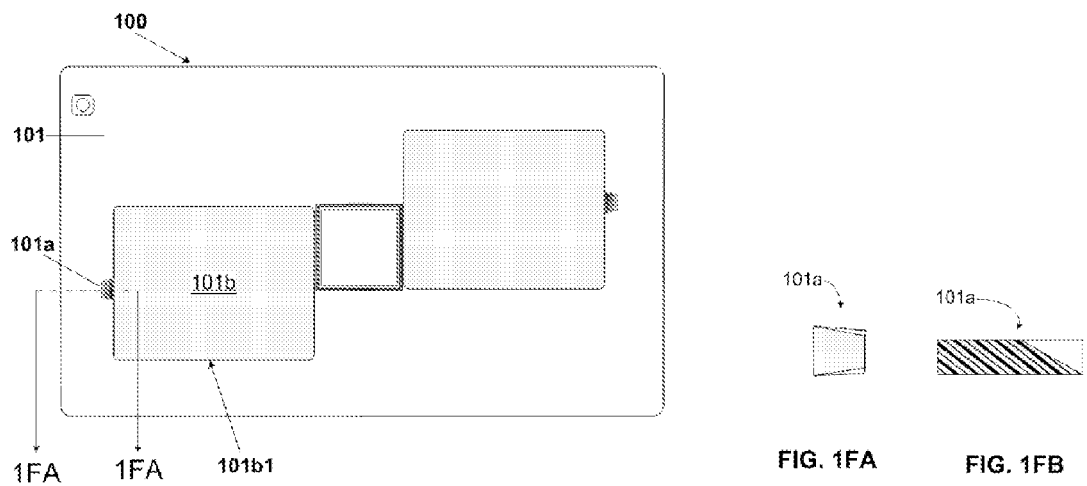
FIG. 1F
FIG. 1FA
FIG. 1FB

FOLDABLE STRUCTURE FOR PORTABLE DEVICES

FIELD OF THE DESCRIBED EMBODIMENTS

The described embodiments are generally to be used with portable devices, which include, but are not limited to, iPhone, iPad, Android based phone or tablet, Windows' based phone or tablet PC and e-Book readers. The present embodiments describe the foldable structure in various shapes for portable devices.

BACKGROUND OF THE INVENTION

Portable devices such as iPad, Android tablet, e-book reader or any hand held electronic devices have become very popular products for consumer use. Many uses involve holding such a device with one hand and operating the touch screen with another hand. There are a few problems with such normal usage:
 a) The holding hand needs to grasp the edge of a device, which induces hand fatigue.
 b) The holding hand needs to balance the device in order to let the other hand touch the screen and read the content, which is difficult to maintain for extended periods.
 c) The holding hand may touch the screen, which would interfere with the function of the device as the device would respond to the holding hand as opposed to the hand used to manipulate the screen. As a result, the wrong screen or frozen screen occurs.
 d) To avoid interference of the holding hand, more valuable space must be allocated at the top, bottom and each side of the portable device's front panel. It is an unfavorable solution as it adds size, but no further function to the device. The size of these devices, to maximize portability is usually designed to be minimized.

Several solutions proposed to solve above problems are listed as follows
 U.S. Pat. No. 6,726,070, Ergonomic input-device holder
 U.S. Pat. No. 8,672,374, Hand holder for tablet computer
 US. Pat. No. 20120025684 Mobile electronic device positioning unit All these inventions provide either grip or stand functions for the portable device in some degree. One kind of solution is the hand band. The band structure does aid in holding the device. The shortcoming is that it is still uncomfortable to hold a device especially when the device is large (above 8 inch). The requirement for the position change and hand twists and the position adjustment still cause fatigue after some time. The best solution is still the hand grip. The hand grip provides the most reliable holding method since hand grips are located at the center gravity of the device. The hand, fingers and grip are all in the most stable and ergonomic position. Unfortunately, current solutions of the hand holder all require separate components or a complex structure. Those solutions have common disadvantages as follows
 a) Additional elements are required to be attached to a portable device, which require extra effort to carry, and install/dismount whenever using it. Some design proposals are very complex and difficult to implement.
 b) Most of hand holder solutions can provide only a limited function.

BRIEF SUMMARY OF THE INVENTION

The present invention provides the compact structure and convenient functions to hold a portable device as a hand grip and also to support the device as a stand. The extended benefit of this invention is to maximize the utilization of the front panel of the portable device. The structure is created at the back panel of a portable device or the device case without any separate components. The structure may be composed of one or more foldable pieces. Each piece is composed of one or more geometric elements or compartments. Those foldable pieces have an unfolded position and folded position. When these pieces are unfolded, they rest in the indent area on the back panel of a portable device or the device case. When these pieces are folded and attached to each other, they form a 3D geometric frame as a handle or a device stand to provide useful functions. To secure the 3D geometric frame and stabilize the structure, different interlocking techniques can be used based on the frame shape and materials used in the foldable pieces.

BRIEF DESCRIPTION OF THE DRAWINGS

The invention will be readily understood by the following detailed description in conjunction with accompanying drawings, wherein reference numerals designate structural elements, and in which:

FIG. 1E shows a top view of the embodiment of FIG. 1A with two foldable pieces in the half opened position.

FIG. 1F shows a top view of the embodiment of FIG. 1A with two foldable pieces in the fully opened position and attached to each other.

FIG. 1FA shows the exploded view of the indented slop that facilitates opening the foldable piece from the indented area.

FIG. 1FB shows the section view of the indented slop that facilitates opening the foldable piece from the indented area.

FIG. 1GA shows the sectional view of the base panel with one side of a foldable piece.

FIG. 1GB shows the exploded top view of the anchor component, which is designed to secure foldable pieces.

FIG. 1GC shows the exploded side view of the anchor component, which is designed to secure foldable pieces.

FIG. 1HA shows the decomposition of two foldable pieces and the anchor component.

FIG. 1HB shows one foldable piece with interlocking edges at each side.

FIG. 1HC shows the top view of the rectangular prism formed.

FIG. 1HD shows the side view of the rectangular prism formed and the interlocking result.

FIG. 2A shows the top view of the embodiment. This structure has one anchor component with two folded pieces in the closed position. Each of two folded pieces has three geographic elements in the rectangular shape.

FIG. 2B shows a side view of the embodiment with two folded pieces in the half open position.

FIG. 2C shows a side view of the embodiment with two folded pieces in the fully opened position. The two folded pieces are attached each other and formed the 3D frame in a hexagonal prism shape.

FIG. 3A shows a top view of the embodiment with an anchor in a raised square prism shape and two folded pieces in the closed position. Each of the two folding pieces has two trapezoidal elements.

FIG. 3B shows a side view of the embodiment with two folded pieces in the half folded position.

FIG. 3C shows a side view of the embodiment with two folded pieces in the fully folded position. The two folded pieces are attached each other and formed the 3D frame in the shape of a frustum pyramid.

FIG. 4A shows a top view of the embodiment with three folded pieces in the closed position. Each of the foldable pieces has a trapezoid shape with a curve at the inner side.

FIG. 4B shows a side view of the embodiment with three folded pieces in the half open position.

FIG. 4C shows a side view of the embodiment with three folded pieces in the fully folded position. The three folded pieces are attached to each other and formed a 3D frame in a vase shape for easier grip.

DETAILED DESCRIPTION OF THE SELECTED EMBODIMENTS

This paper describes various embodiments that relate to the foldable structure and apparatus based on design preferences, aesthetics and materials used. Reference will be made in detail to representative embodiments illustrated in the accompanying drawings. It should be understood that the following descriptions are not intended to limit the embodiments to one preferred embodiment. On the contrary, it is intended to cover alternatives, modifications, and equivalents as can be included within the spirit and scope of the described embodiments as defined by the appended claims.

Figure 1A:
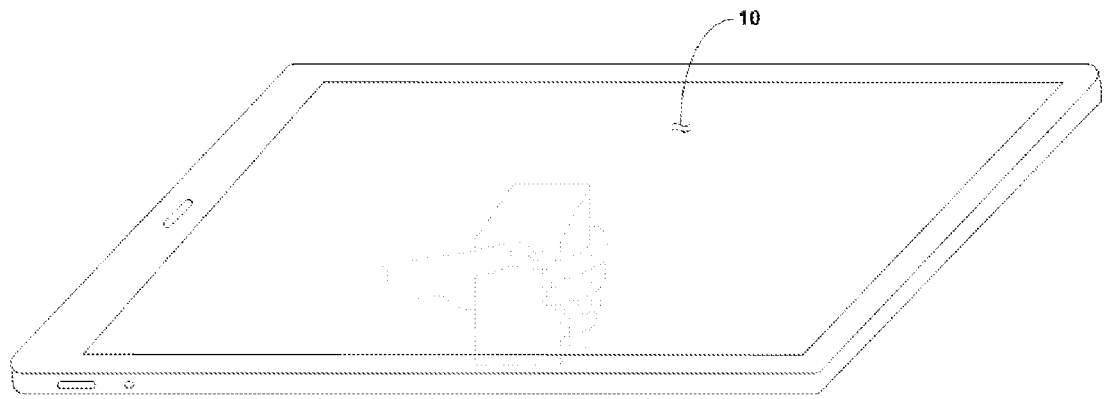
FIG. 1A shows a perspective view illustrating a foldable structure according to a first embodiment of the disclosure, on which a portable device with a handle of a rectangular prism at the back panel is held by a hand in accordance with described embodiments.
Figure 1B:
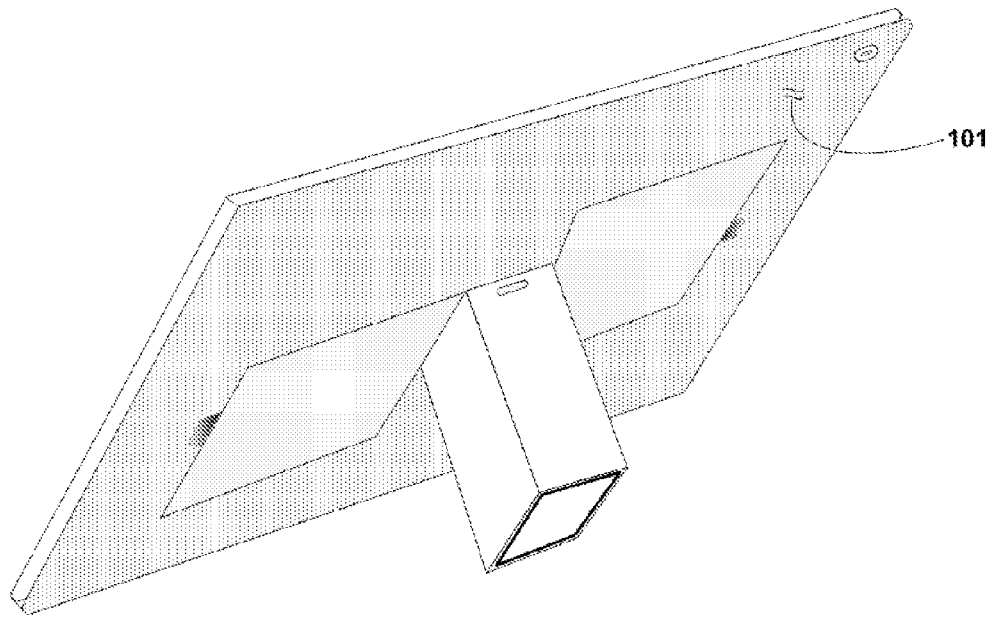
FIG. 1B shows a perspective view of the foldable structure of FIG. 1A, wherein a portable device with the foldable structure in the shape of a rectangular prism as a device stand in accordance with described embodiments.
Figure 1C:
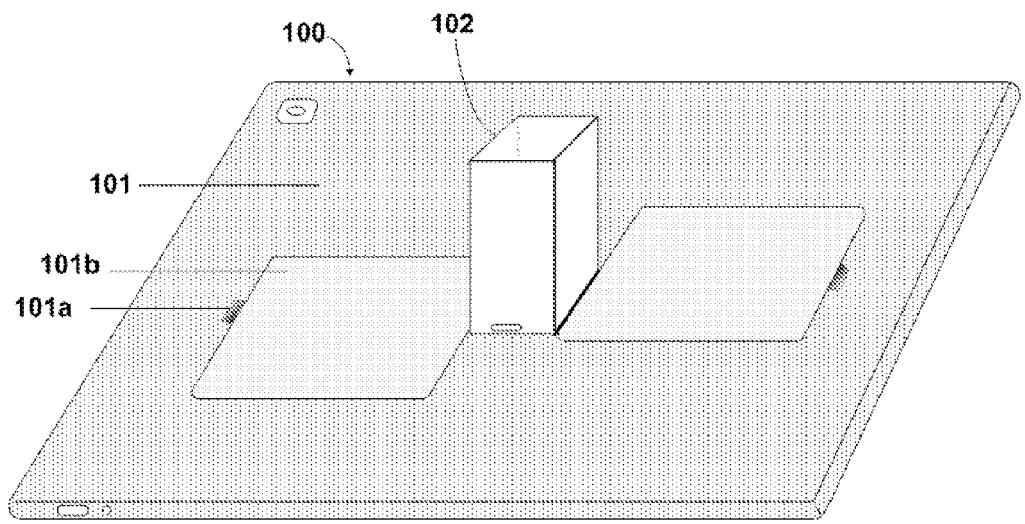
FIG. 1C shows a side view of the embodiment of FIG. 1A.

The following description relates in general to the foldable structures that can be used to form a 3D geographic frame that serves the purpose of a handheld grip and device support stand at the back panel of a portal device. The phrase "back panel" will be used in the following detailed description to refer "the rear side of a portal device or the device case". The first embodiment of the invention is shown in FIG. 1A and FIG. 1B, with the visual effects of a handheld grip and a device stand based on a foldable structure. A portable device has two panels. As show in FIG. 1A and FIG. 1B, the front panel 10 is referred as the screen facing side of a portable device, the back panel 101 is referred as the rear side (opposite to the screen facing side) of a portable device. In this example, the foldable structured is constructed by using plastic or other synthetic material on the back panel 101 of a portable device or the portable device case. There are two foldable pieces 102, with a symmetric and rectangular shape attached to the back panel 101. Two foldable pieces 102 rest in the indented area 101b at the back panel 101 in FIG. 1D. To make sure the foldable pieces 102 rest evenly and tightly, the foldable pieces have a smooth edge 102b2 meeting the edge of the indented area edge 101b1 in FIG. 1GA. The other alternative is to use the interlocking mechanism with a male-female cap or magnets between the base panel and the bottom side of the foldable pieces (not shown). In other embodiments, the foldable pieces may not necessarily sit flush with the base panel.

Figure 1D:
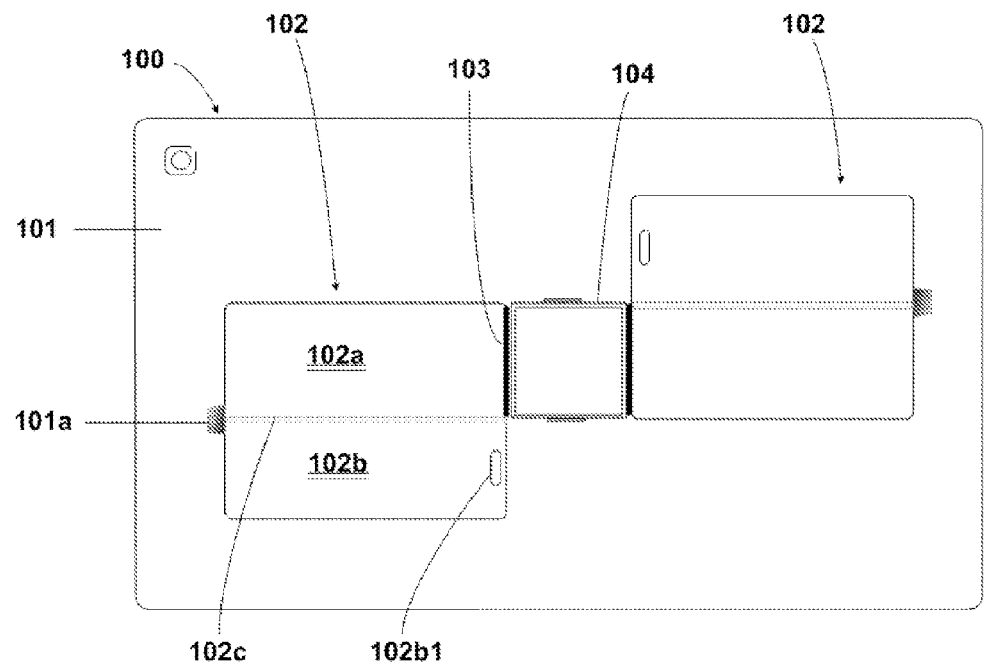
FIG. 1D shows a top view of the embodiment of FIG. 1A with two foldable pieces in the unfolded position.
Figure 1G:
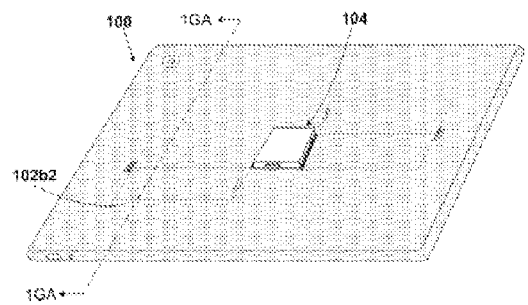
FIG. 1G shows a side view of the embodiment of FIG. 1A with two foldable pieces in the unfolded position.
Figure 1G:
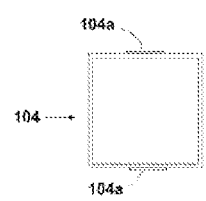
Figure 1G:
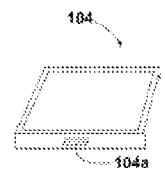
Figure 1G:
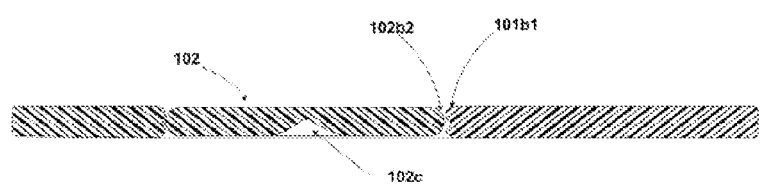

When the foldable pieces 102 rest in the indented area 101b, they are almost unnoticeable except for the edges Illustrated in FIG. 1G, two small indented slopes 101a on the base panel facilitate a user to open the foldable structure 100 by a finger. Partial view FIG. 1FA and section view FIG. 1FB show the detail structure of the slowly indented slope 101a. After two foldable pieces 102 are lifted from the indented area 101b, they can be folded based upon the shape of geometric elements. In this case, there are two rectangular geometric elements 102a and 102b for each foldable piece 102.

Figure 1H:
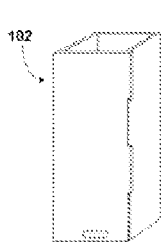
FIG. 1H shows the interlocking mechanism of the embodiment in detail. The 3D geographic frame—rectangular prim shape is formed after two foldable pieces and the anchor component are interlocked.
Figure 1H:
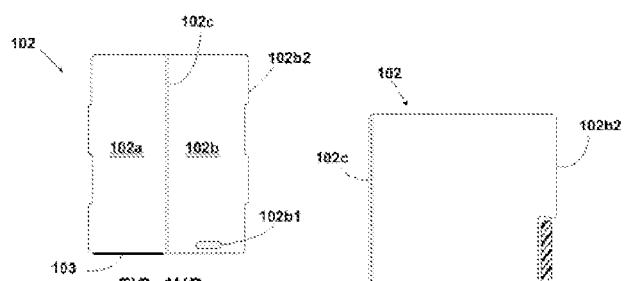
Figure 1H:
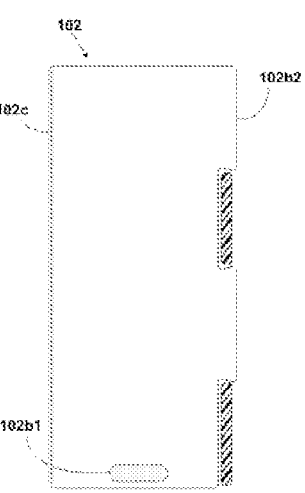
Figure 1H:
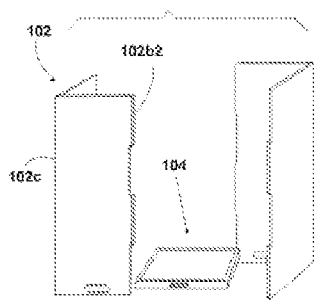
Figure 1H:
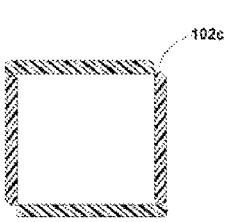

FIG. 1D shows the foldable pieces 102 in the unfolded position. The geometric element 102a of the foldable piece 102 has an attachment to the anchor component 104 through a hinge mechanism 103. The geometric elements 102b have no other attachments to any other component in the foldable structure 100 other than geometric elements 102a. They are free to fold and form a 3D frame showed in FIG. 1E. When the two pieces 102 are folded, they can be attached to each other to form a rectangular prism normal to the back panel 101 as illustrated in FIG. 1F. The hinge mechanism 103 can be implemented by various mechanisms available. It can be implemented by a hinge. It can also be implemented by conjoining two components with a flexible foldable layer in the direct molding method if a plastic or other synthetic materials in the foldable structure. In this case, all components in the foldable structure 100 can be molded together. Illustrated in FIG. 1GA, the foldable region 102c is formed in a direct molding technique. FIG. 1HC and FIG. 1HD show the result after foldable pieces 102 being folded along folding lines of the foldable region 102c and attached to each other.

To secure the rectangular prism, the interlocking mechanism needs to be used. Various interlocking methods are available for such a purpose. FIG. 1H shows one specific interlocking mechanism. FIGS. 1HA-D shows the detailed structure, components and one particular interlocking technique used in this example case by interlocking the edge 102b2 of the geometric elements 102. The anchor component 104 is designed to further stabilize the 3D geographic frame by supporting the frame at the attachment area between the foldable pieces 102 and the back panel 101. The anchor component 104 is a small block in a raised square shape (a square prism with low height) located at the center of the back panel 101. There are two pins 104a on the anchor component 104, which can lock two foldable pieces 102 through the slot 102b1 with the pin 104a illustrated in FIG. 1 GB and FIG. 1GC. The anchor component 104 can be attached to the base panel by molding pins, a strong glue or even molded directly to the base panel during the manufacturing process.

Figure 2A:
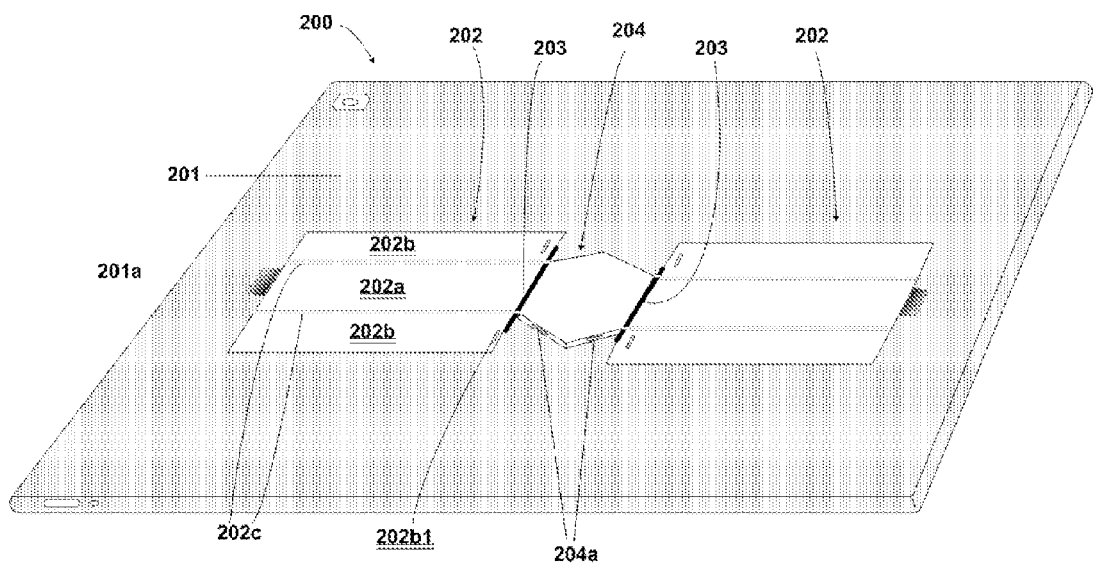
FIGS. 2A-C show a second embodiment of the disclosure where a 3D geographic frame formed is a hexagonal prism on the back panel of a portable device.
Figure 2B:
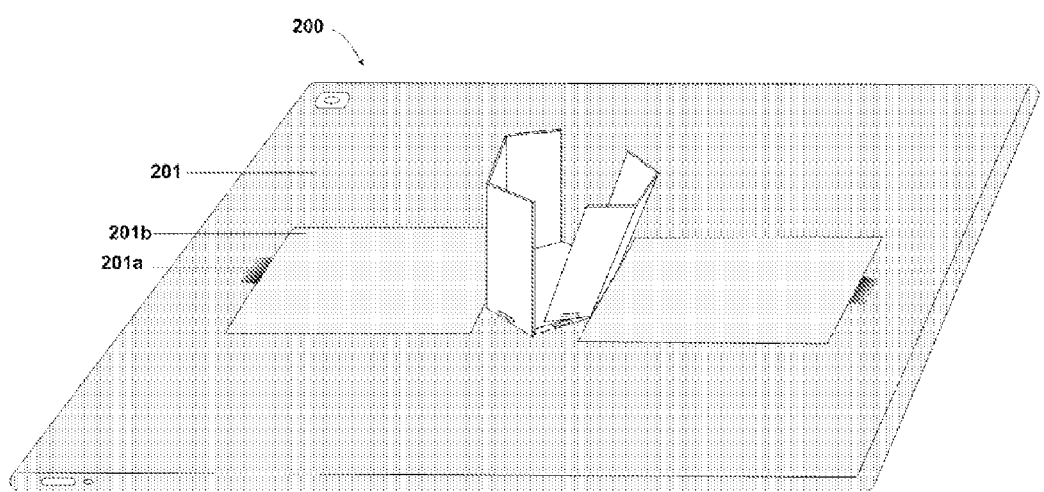
Figure 2C:
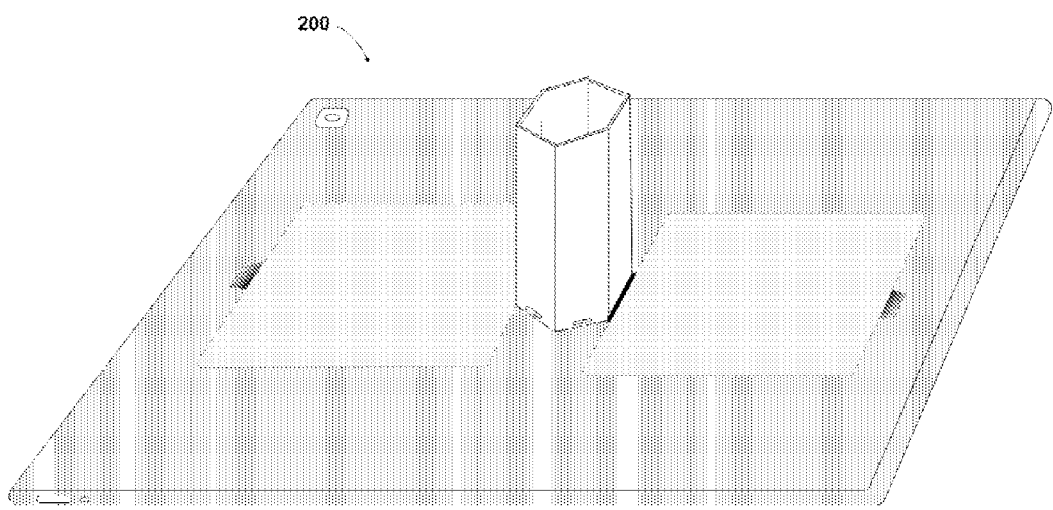

FIGS. 2A, 2B and 2C show a second embodiment of the present invention wherein the foldable structure 200 constructed by two foldable pieces 202. Each piece is constructed by molding three geometric elements 202a, 202b and 202a side by side. All geometric elements are symmetric and rectangular. When two foldable pieces are fully folded along the foldable region 202c, flipped up through a hinge mechanism 203, attached together and secured by the interlocking mechanism with a raised anchor component 204, a hexagonal prism frame is formed in the middle of and normal to the back panel 201.

Figure 3A:
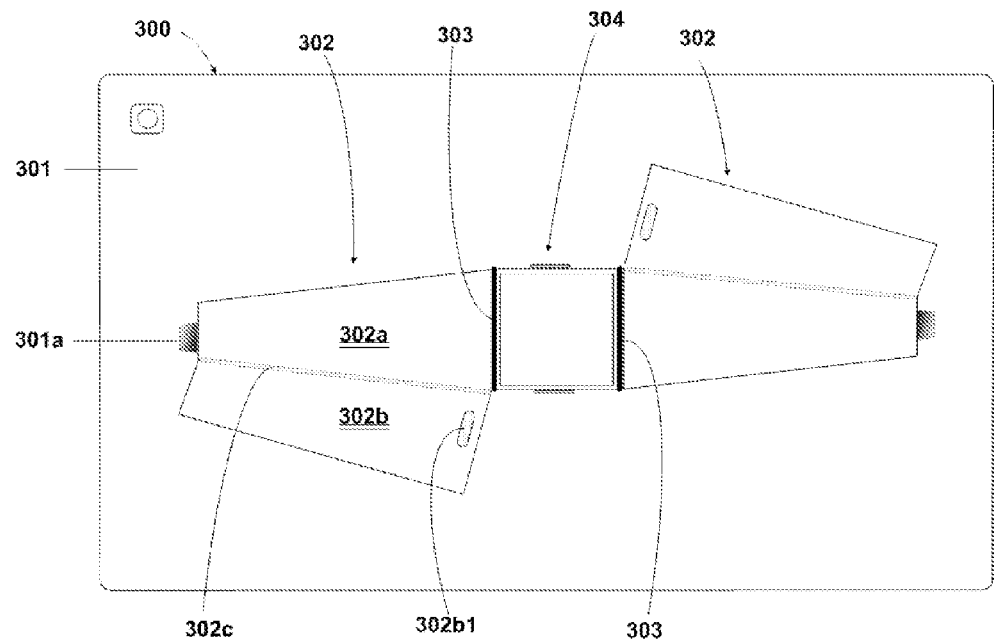
FIGS. 3A-C show a third embodiment of the disclosure where a 3D geographic frame formed is a 4-side frustum pyramid on the back panel of a portable device.
Figure 3B:
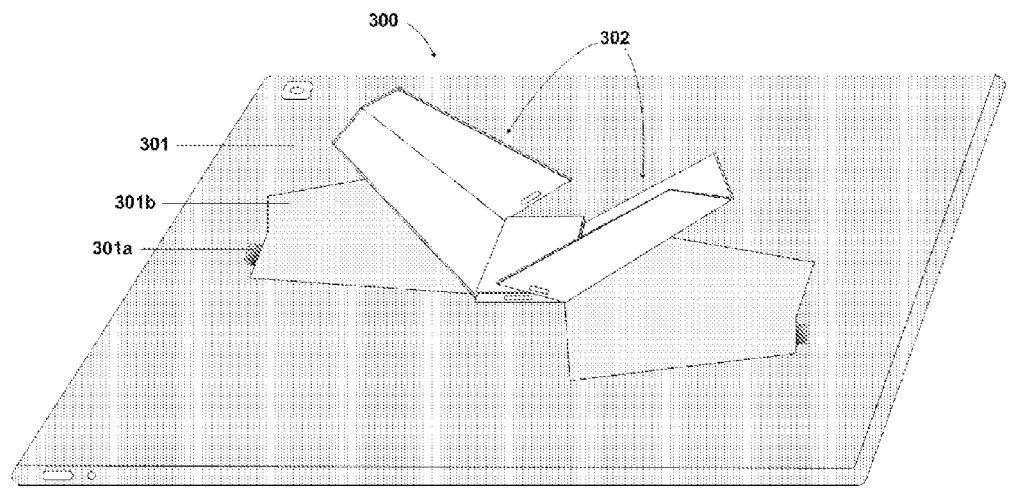
Figure 3C:
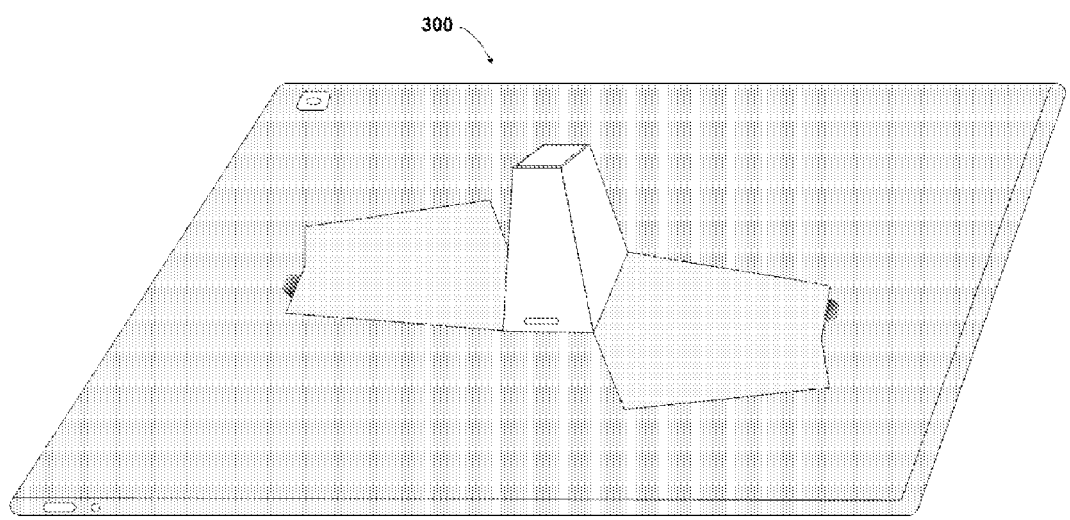

FIGS. 3A, 3B and 3C show the third embodiment of the present invention wherein the foldable structure 300 constructed by two foldable pieces 302. Each foldable piece is constructed by molding two geometric elements 302a and 302b side by side. All geometric elements are symmetric and trapezoidal. When the two foldable pieces 302 are fully folded along the foldable region 302c, flipped up through a hinge mechanism 303, attached together and secured by the interlocking mechanism with raised anchor component 304, a 4-side frustum pyramid is formed in the middle of and normal to the base panel.

Figure 4A:
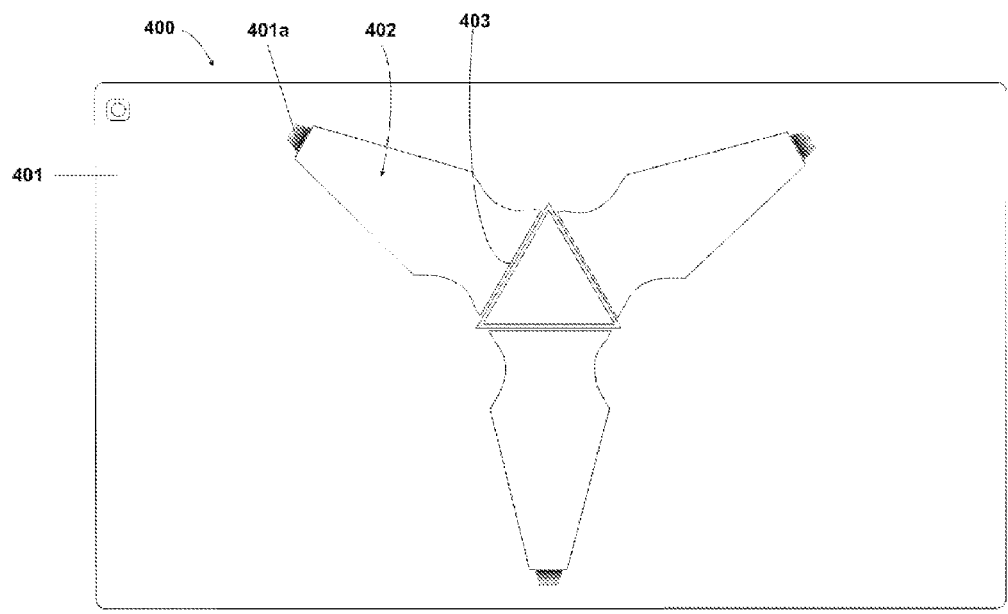
FIGS. 4A-C show a fourth embodiment of the disclosure where a 3D geographic frame formed is a 3-side frustum pyramid on the back panel of a portable device with a vase neck shape at top for easier grip.
Figure 4B:
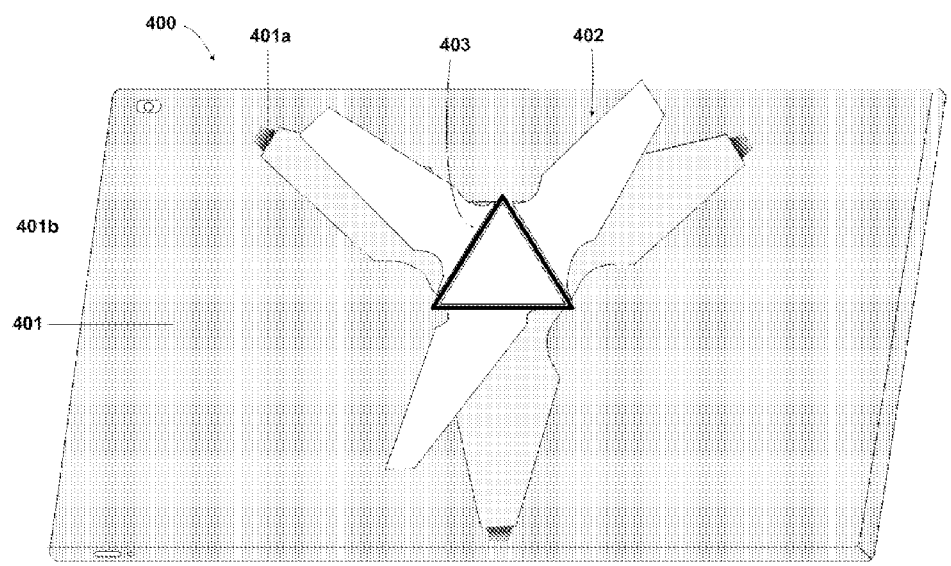
Figure 4C:
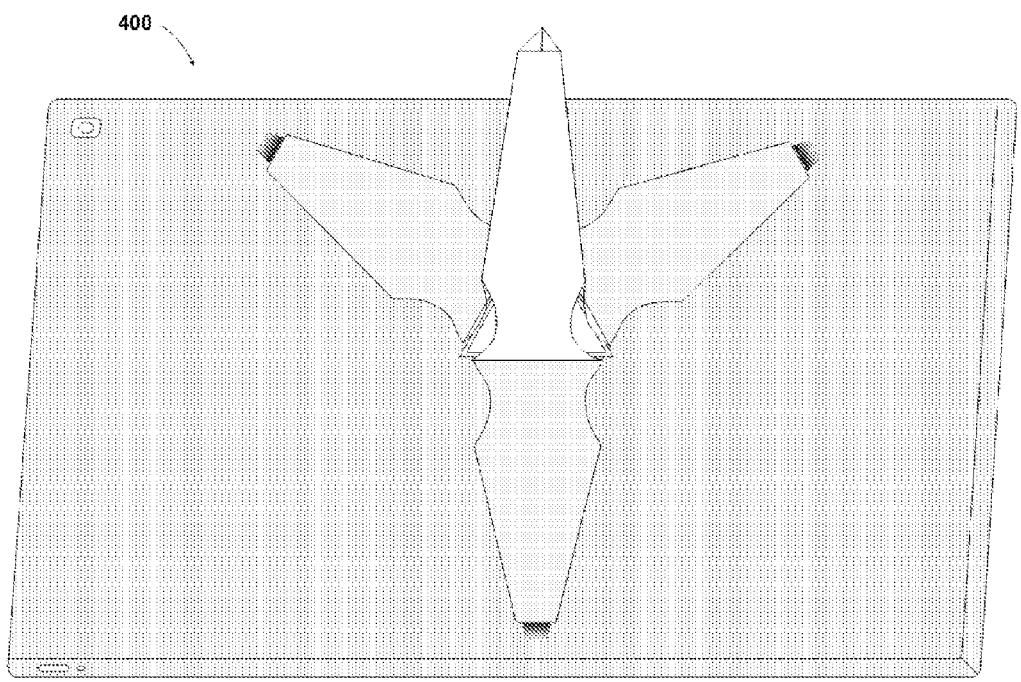

FIGS. 4A, 4B and 4C show fourth embodiment of the present invention wherein the foldable structure 400 was constructed by three foldable pieces 402. All three pieces 402 are symmetric and trapezoidal shape with a curved cutout. When the three pieces are lifted, flipped up through a hinge mechanism 403, attached together and secured by the interlocking mechanism, a vase shape with a triangle frustum pyramid is formed in the middle of and normal to the back panel 401. It is a stable structure with an ergonomic grip and attractive aesthetics.

The similar methods can be used to form other 3-dimensional shape such as a pentagonal prism or octagonal prism, pyramids or cylinders. They are not listed here since the technique and elements required are the same or very similar. In general, the pyramid structure is more stable in terms of the physical characteristics. However, such structure has a slanted surface and may be slippery. To prevent the slippage, a curve on top of each foldable piece can be constructed.

Having now described some illustrative embodiments of the invention, it should be apparent to those skilled in the art that the foregoing is illustrative and not limiting, having been presented by way of example. In particular, although many of the examples presented herein involve specific combinations of methodology or elements, it is understood that those methods and those elements may be combined in other ways to accomplish the same objectives. Specifically, the 3D geographic frame formed by the foldable pieces from the base panel is not necessarily normal to the base panel. The location of the formed 3D geographic structure is not necessarily located in the middle of the base panel either. Methods, elements and features discussed only in connection with one embodiment are not intended to be excluded from a similar role in other embodiments.

I claim:

1. A foldable structure, constructed on a back panel located on an opposite side of a display surface of a portable device as a hand grip, the foldable structure comprising: an anchor component including: a small block in a raised square shape, wherein the block pivotally mounted on the back panel of the portable device at a center area, wherein two pins set on the small block, one of the pins location on a first raised narrow sidewall of the block and the other one of the pins located at another raised narrow sidewall opposite to the first raised narrow sidewall; and two foldable pieces located at left and right sides of the anchor component symmetrically, wherein each foldable piece including: a first and a second geometric elements with a same rectangular shape and each geometric elements arranged side by side along a first long side and connected to each other by a foldable region, two U-shaped protrusions located on each second opposite long side and offset to each other on both second long sides respectively, wherein the first geometric element connecting to the anchor component by a hinge, wherein the second geometric element next to the first geometric element including a slot located on an edge adjacent to the anchor component; and two indented areas graved in the back panel and formed two recesses; the two foldable pieces are received in the two recesses and flush with the back panel when the foldable pieces are in an unfolded position; and when the foldable pieces are in a folded position, each of the slots engages to one of the pins closer to the slot respectively; and the two U-shaped protrusions located on each of the second long sides interleave and engage to each other and form a square prism with a longitudinal direction perpendicular to the display surface.

2. The foldable structure according to claim 1, wherein those foldable pieces may be made in metal, plastic, leather, artificial polymer material or combination of those materials.

3. The foldable structure according to claim 1 having different variations, wherein each variation comprising a plurality of foldable pieces and each foldable piece including a plurality of geometric elements with differences in size and/or shape from claim 1, wherein each variation can form a different three dimensional structure, such as a hexagon prism frame, a 4-side frustum pyramid frame or 3-side frustum pyramid frame.

4. A foldable structure according to claim 1, wherein a portable device is a smart phone, a tablet computer or an e-Book reader, wherein a portable device has two panels, one panel with the touch screen of a portable device referred as the front panel and other panel opposite to the front panel at the back of the portable device or the portable device case referred as the back panel.

* * * * *